US006671126B2

(12) United States Patent
Durth et al.

(10) Patent No.: US 6,671,126 B2
(45) Date of Patent: Dec. 30, 2003

(54) OVERVOLTAGE PROTECTION DEVICE

(75) Inventors: Rainer Durth, Horn-Bad Meinberg (DE); Martin Wetter, Detmold (DE); Joachim Wosgien, Lohne (DE)

(73) Assignee: Phoenix Contact GmbH & Co., Blomberg (DE)

( * ) Notice: Subject to any disclaimer, the term of this patent is extended or adjusted under 35 U.S.C. 154(b) by 0 days.

(21) Appl. No.: 10/088,633

(22) PCT Filed: Jul. 23, 2001

(86) PCT No.: PCT/EP01/08487

§ 371 (c)(1), (2), (4) Date: Mar. 20, 2002

(87) PCT Pub. No.: WO02/09251

PCT Pub. Date: Jan. 31, 2002

(65) Prior Publication Data

US 2002/0149898 A1 Oct. 17, 2002

(30) Foreign Application Priority Data

Jul. 21, 2000 (DE) ........................................ 100 35 952
Aug. 16, 2000 (DE) ........................................ 100 40 603

(51) Int. Cl.[7] ............................ H02H 1/04; H02H 3/22; H02H 9/06

(52) U.S. Cl. ....................................... 360/120; 360/134

(58) Field of Search ................................ 361/120, 134, 361/40, 119

(56) References Cited

U.S. PATENT DOCUMENTS 3,780,350 A * 12/1973 Sanger et al. .............. 317/61.5
3,811,064 A * 5/1974 Kawiecki ..................... 313/325
3,958,154 A * 5/1976 Hill et al.
4,072,996 A * 2/1978 Rudolph ..................... 361/134
4,325,100 A * 4/1982 Baumbach .................. 361/119
6,037,715 A * 3/2000 Hammon, III et al. ...... 313/631

FOREIGN PATENT DOCUMENTS

| | | |
|---|---|---|
| DE | 27 07 335 | 7/1978 |
| DE | 41 41 682 A1 | 7/1993 |
| DE | 44 02 615 A1 | 12/1994 |
| DE | 195 10 181 C1 | 6/1996 |

* cited by examiner

*Primary Examiner*—Brian Sircus
*Assistant Examiner*—Z Kitov
(74) *Attorney, Agent, or Firm*—Nixon Peabody LLP; David S. Safran

(57) ABSTRACT

An overvoltage protection means is described, with a first electrode (1), with a second electrode (2), with an air breakdown spark gap (3) which is present or which acts between the electrodes (1, 2), and with a housing which holds the electrodes (1, 2), when the air breakdown spark gap (3) is initiated an arc (4) forming between the first electrode (1) and the second electrode (2)

As claimed in the invention, an overvoltage protection means is devised which is characterized by high line follow current extinguishing capacity, but which nevertheless can be implemented with a simple structure, by the fact that a third electrode (5) is assigned to the first electrode (1) and the second electrode (2) and between the first electrode (1) and the third electrode (5) a second air breakdown spark gap (6) is present or active, that the third electrode (5) is connected via at least one impedance, especially a varistor (7), directly or indirectly to the second electrode (2), and that after discharging the surge current via the first electrode (1), the first air breakdown spark gap (3) and the second electrode (2), the remaining arc (4) can be moved from the first air breakdown spark gap (3) to the second air breakdown spark gap (6), especially by pneumatic or magnetic blow-out.

11 Claims, 3 Drawing Sheets

OVERVOLTAGE PROTECTION DEVICE

BACKGROUND OF THE INVENTION

1. Field of the Invention

The invention relates to an over-voltage protection means which includes a first electrode and a second electrode having an air breakdown spark gap present between the electrodes, and further including a housing to holds the electrodes. When the air breakdown spark in the gap is initiated, an arc forms between the first electrode and the second electrode.

2. Description of Related Art

Electrical systems, including electronic measurement, control and switching circuits, as well as telecommunications means and systems, are sensitive to transient over-voltages that can occur due to atmospheric discharges, switching operations, or short circuits in the power supply grids. This sensitivity to over-voltage has increased to a degree in which electronic components, particularly when transistors and thyristors are used, are greatly endangered by transient over-voltages.

Electrical circuits operate normally without problems at the voltage specified for them, i.e., the rated voltage. Normal operation does not happen however when over-voltages occur. Over-voltages are considered to be all voltages which are above the upper tolerance limit of the rated voltages. They include mainly transient over-voltages which can occur not only from atmospheric discharges, but also from switching operations or short circuits in power supply grids. Such over-voltages can be conductively, inductively or capacitively coupled into electrical circuits. In order to protect electrical or electronic circuits, especially electronic measurement, control and switching circuits, and especially telecommunications means and systems, against transient over-voltages, over-voltage protection means have been developed and in use for more than twenty years.

An important component of an over-voltage protection means of the type which are the subject of the present invention is at least one spark gap which responds at a certain over-voltage, i.e., the sparkover voltage, and thus prevents over-voltages which are larger than the sparkover voltage of the spark gap from occurring in the circuit protected by the over-voltage protection means.

It was stated initially that the over-voltage protection means of the invention has two electrodes and an air breakdown spark gap which is present or which acts between the electrodes. In addition to over-voltage protection means with an air breakdown spark gap, there are over-voltage protection means with an air flashover spark gap in which upon activation a creeping discharge occurs. Over-voltage protection means with an air breakdown spark gap compared to a over-voltage protection means with an air flashover spark gap have the advantage of a greater current carrying capacity, but also have the disadvantage of a higher and not particularly constant sparkover voltage. Therefore different over-voltage protection means with an air breakdown spark gap have been proposed which have been improved with respect to the sparkover voltage. In the area of the electrodes, i.e., the air breakdown spark gap which acts between the electrodes, initiation aids have been developed. For example, between the electrodes there is an initiation aid made of plastic which triggers a creeping discharge by projecting like a crosspiece at least partially into the air breakdown spark gap.

An over-voltage protection means of this described type is disclosed in German Patent Document No. 44 02 615 C2.

This over-voltage protection means has two, angular narrow electrodes in which each electrode has an arcing horn and a connecting leg angled therefrom. In addition, the arcing horns of the electrodes, in the area bordering the connecting legs, are provided with a hole. The holes provided in the arcing horns of the electrodes provide the capability, at the instant of initiation of the over-voltage protection element, for the resulting arc to be "started" by a thermal pressure effect which migrates away from its origin. Since the arcing horns of the electrodes are arranged in a V-shape to one another, the gap to be bridged by the arc is thus enlarged as the arc migrates away, thereby increasing the arc voltage.

When the air breakdown spark gap is initiated, the arc which forms causes a low-impedance connection between the two electrodes. For this reason, at the prevailing line voltage, an unwanted line follow current follows via the over-voltage protection means; therefore, an effort should be made to extinguish the arc as quickly as possible after the completed discharge process. One possibility for achieving this is to increase the arc length and thus the arc voltage. This solution is disclosed in the over-voltage protection means of the German Patent Document No. 44 02 615 C2. The disadvantage of this solution is that the geometrical dimensions of the electrodes become correspondingly large, and thus this solution is dependent on geometric considerations.

Another solution for extinguishing the arc is to cool the over-voltage protection means by the cooling action of insulation walls and by using insulators which release gas. In this solution a strong flow of the extinguishing gas is necessary which requires a major construction effort.

SUMMARY OF THE INVENTION

The object of this invention is to devise an over-voltage protection means of the type which is characterized by a high line follow current extinguishing capability, but which nevertheless can be implemented with a simple construction.

The over-voltage protection means of the invention in which the aforementioned object is achieved is characterized by a third electrode, along with the first electrode and the second electrode, in which between the first electrode and the third electrode a second air breakdown spark gap is present. The third electrode is connected via at least one impedance, e.g., a varistor, directly or indirectly to the second electrode, so that after discharging the surge current via the first electrode, the first air breakdown spark gap and the second electrode, the remaining arc can be moved from the first air breakdown spark gap to the second air breakdown spark gap, particularly by a pneumatic or magnetic blow-out.

As in the prior art, the over-voltage protection means of the invention is generally parallel to the input of the circuit, the system, or the device to be protected, and is conductively connected to the lines or terminals between which the operating voltage is applied in operation. As is normal, the first line or the first terminal is energized, while the second line or the second terminal is grounded. Using this terminology then, it is generally assumed that the first electrode of the over-voltage means should be connected to the energized line or terminal and the second electrode of the over-voltage protection means is connected to ground. Of course, the connections of the over-voltage protection means of the invention can be reversed, and the over-voltage protection means of the invention can be used not only to protect circuits in which there is an AC voltage as the operating voltage, but can also be easily used when the operating voltage of the circuit to be protected is a DC voltage.

As mentioned above, the over-voltage protection means includes a third electrode which is connected directly or indirectly to the second electrode via at least one impedance. A direct connection means that the third electrode is connected to the second electrode. An indirect connection of the third electrode to the second electrode means that this connection is made outside the over-voltage protection means, for example, the over-voltage protection means is a three-pole means in which both the second electrode and also the third electrode are grounded.

In the over-voltage protection means of the invention, the air breakdown spark gap initiates when the sparkover voltage is present, and as is conventional in the prior art, between the first and the second electrode. Additionally, to improve the response characteristic of the over-voltage protection means of the invention a known initiation aid can be implemented in the area of the air breakdown spark gap which acts between the electrodes such that for the initiated spark gap the surge current is discharged as is known. To suppress a possible line follow current or to extinguish a line follow current which may occur, the remaining arc is moved from the first air breakdown spark gap to the second air breakdown spark gap. Because the third electrode, unlike the second electrode, is not connected directly, but via at least one impedance, such as a varistor, for example, to ground, a suddenly increased impedance takes effect, so that a line follow current is prevented or an existing line follow current is extinguished. Due to the impedance connected downstream of the third electrode, between the first electrode and the energized line, the energized terminal and the ground, there is a voltage divider which provides for a partial voltage prevailing between the first electrode and the third electrode which is less than the arc voltage at the prevailing line voltage with the result that the partial voltage is thus no longer sufficient to maintain the arc.

The manner in which the arc remaining after discharge of the surge current is moved from the first air breakdown spark gap to the second air breakdown spark gap or from the first electrode and the second electrode to the first electrode and the third electrode, can be accomplished by different measures, for example, by pneumatic or magnetic blow-out. Pneumatic blow-out can be accomplished by the gas or plasma stream resulting from the arc thermal currents being guided in a controlled manner. One preferred embodiment of the over-voltage protection means of the invention which implements the pneumatic blow-out includes providing the housing and/or the third electrode with at least one opening, such that pressure equalization occurs through the opening and the pressure equalization causes a controlled propagation of the gas or plasma stream from the second electrode to the third electrode. With the propagation of the gas or plasma stream from the second electrode in the direction to the third electrode, the base of the arc is moved from the second electrode to the third electrode.

A magnetic blow-out can be accomplished by arranging the electrical terminals of the over-voltage protection means in the conventional manner such that the surge current produces a magnetic field which moves the arc from the first air breakdown spark gap to the second air breakdown spark gap, i.e., from the first electrode and second electrode to the first electrode and third electrode.

The over-voltage protection means of the invention can therefore include both pneumatic and also magnetic blow-out of the remaining arc.

This invention is fundamentally independent of the specific construction of the over-voltage protection means, particularly the type and shape of electrodes, the embodiment of the air breakdown spark gap, or the use of initiation aids. Two preferred embodiments of the over-voltage projections of the invention are briefly discussed below.

In the first preferred embodiment of the over-voltage protection means of the invention, the housing has an essentially cylindrical shape and the first electrode is made as a rod-shaped central electrode, while the second electrode and third electrodes are made as cylindrical outside electrodes which are arranged concentrically around the first electrode. The second electrode and third electrodes are located in a spaced axial relationship to one another such that part of the first electrode is surrounded by the second electrode and another part of the first electrode is surrounded by the third electrode. In this embodiment, the arc is then blown parallel to the lengthwise extension of the first electrode from the second electrode to the third electrode, such as by at least one radial opening located in the third electrode or at the transition of the third electrode to the housing.

A second preferred embodiment of the over-voltage protection means of the invention is characterized by the first electrode being made as a flat round disk, while the second electrode and third electrodes are located opposite the first electrode such that the second electrode is located centrally to the first electrode and the third electrode is located concentrically around the second electrode. This configuration of the electrodes yields an over-voltage protection means with a very short overall height. Preferably, the third electrode is not otherwise made in the shape of an annulus, but instead in the shape of a segment of an annulus, i.e., hemispherically, so that the third electrode concentrically surrounds the second electrode only partially. Furthermore, it is advantageous in one particular embodiment of the invention to make the axial distance between the first electrode and the second electrode smaller than the axial distance between the first electrode and the third electrode. This can be accomplished by different overall heights of the electrodes, or by arrangement of the second electrode and the third electrode. Because the distance between the first electrode and the second electrode is less than the distance between the first electrode and the third electrode, it is ensured that first the air breakdown spark gap initiates between the first electrode and the second electrode and the surge current is discharged via this air breakdown spark gap, and therefore via the first electrode and the second electrode.

There are a host of possibilities for embodying and developing the over-voltage protection means of the invention. In this respect, reference is made to the following description of preferred embodiments in conjunction with the drawings.

DETAILED DESCRIPTION OF THE INVENTION

Figure 1:
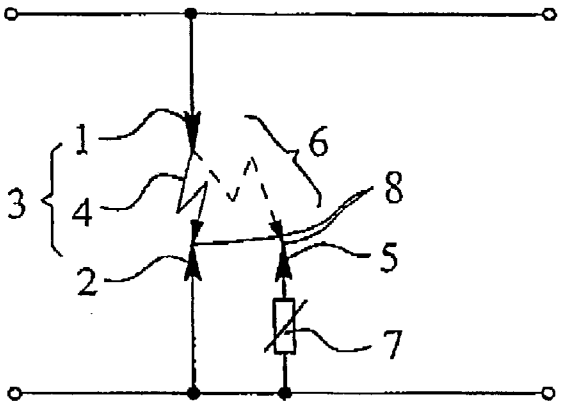
FIG. 1 shows a representation of the operating principle of the arrangement of the electrodes in an over-voltage protection means of the invention.

FIG. 1 illustrates the operating principle of the over-voltage protection means of the invention, that is for a first electrode 1, a second electrode 2 and an air breakdown spark gap 3 that is active between the electrodes 1, 2, if a transient over-voltage occurs which is greater than the sparkover voltage of the over-voltage protection means, the over-voltage protection means responds, i.e. the air breakdown spark gap 3 is initiated, and an arc 4 is formed between the first electrode 1 and the second electrode 2. The arc 4 yields a relatively low-resistance connection between the first electrode 1 and the second electrode 2 so that at the prevailing operating voltage an unwanted line follow current can flow via the overvoltage protection means.

In the over-voltage protection means of the invention, a line follow current is prevented or a line follow current which has occurred is extinguished by the third electrode 5, assigned to the first electrode 1 and the second electrode 2, which forms an active second air breakdown spark gap 6 between the first electrode 1 and the third electrode 5. The third electrode 5 is also connected via at least one impedance, for example a varistor 7, directly or indirectly to the second electrode 2, and such that after discharge of the surge current via the first electrode 1, the first air breakdown spark gap 3 and the second electrode 2, the remaining arc 4 is moved from the first air breakdown spark gap 3 to the air breakdown spark gap 6, for example by pneumatic or magnetic blow-out. If the arc is moved from the first electrode 1 and the second electrode 2 to the first electrode 1 and the third electrode 5, some of the existing operating voltage drops out via the varistor 7, and, by suitable dimensioning of the varistor 7, can have the result that the voltage between the first electrode 1 and the third electrode 5 is no longer sufficient to maintain the arc 4.

Figure 2:
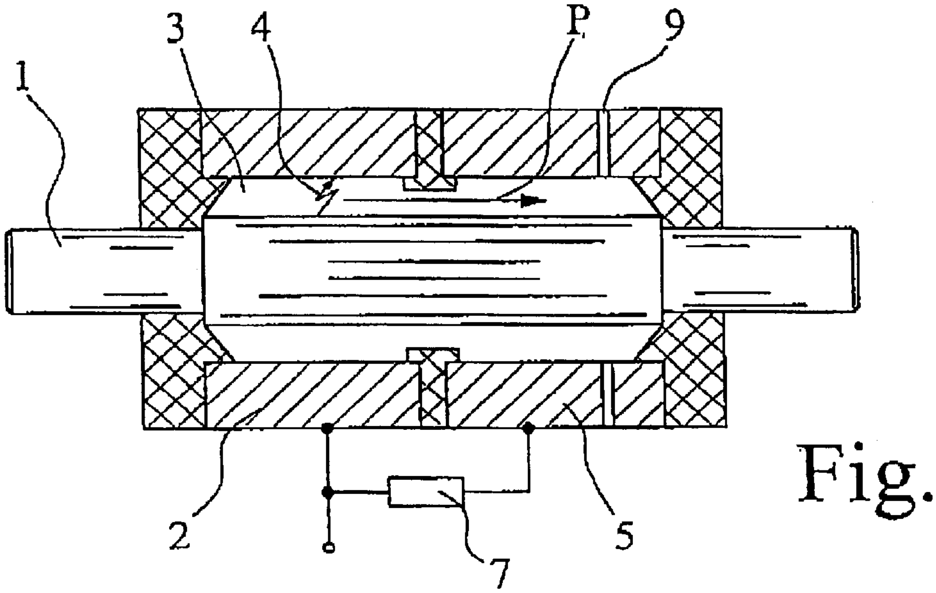
FIG. 2 shows a schematic of a first embodiment of the over-voltage protection means of the invention.
Figure 3:
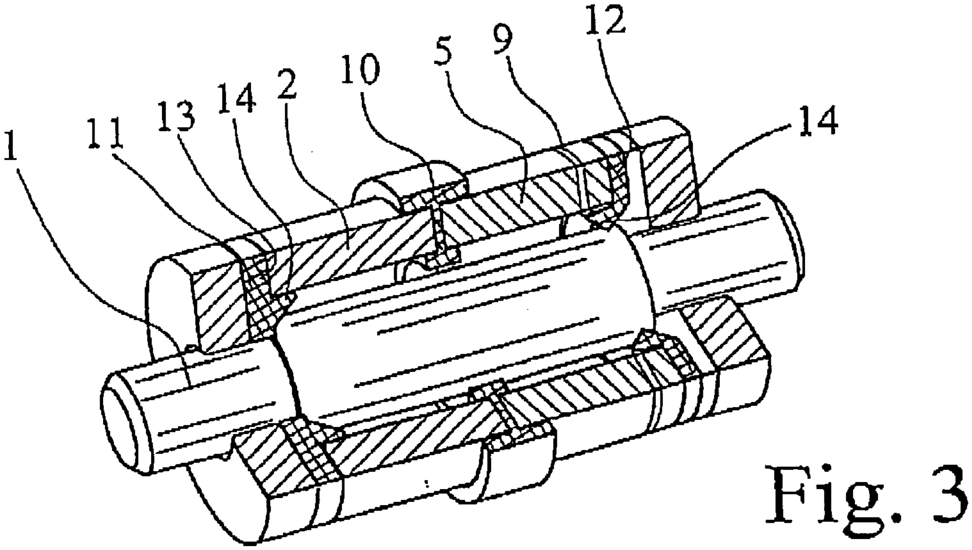
FIG. 3 shows another partial sectional representation of the electrode arrangement of the over-voltage protection means of the invention as shown in FIG. 2.

FIGS. 2 and 3 show parts of a first advantageous embodiment of the overvoltage protection means in which the first electrode 1 is made as a rod-shaped electrode and the second electrode 2 and the third electrode 5 are made as cylindrical outside electrodes and are arranged concentrically around the first electrode 1. The second electrode 2 and the third electrode 5 are located at a spaced axial distance from one another. The third electrode 5 has a radial opening 9 by which pressure equalization takes place, the pressure equalization causing propagation of the plasma stream from the area between the first electrode 1 and the second electrode 2 into the area between the first electrode 1 and the third electrode 5. The direction of the plasma stream is labelled P in FIG. 2. This plasma stream, which is caused by the pressure equalization, drives an arc 4 that is present between the first electrode 1 and the base 8 of the second electrode 2 to be moved to the base 8 of the third electrode 5.

FIG. 2, and especially FIG. 3, illustrate that the second electrode 2 and the third electrode 5 are separated from one another by an annular spacer 10. The radial distance between the first electrode 1 and the second electrode 2 or the third electrode 5 is guaranteed by two annular carrier elements 11, 12, the carrier elements 11, 12 having a radial section 13 and an axial section 14. The axial section 14 of the carrier elements 11, 12 is used together with the annular spacer 10 as support for the second electrode 2 and the third electrode 5. Both the annular spacer 10 and also the carrier element 11, 12 are preferably made of plastic. The housing which holds the electrodes 1, 2, 5 is not shown in FIGS. 2 and 3. One such housing can be made essentially cylindrical, similar to the arrangement of the electrodes 1, 2, 5.

Figure 4:
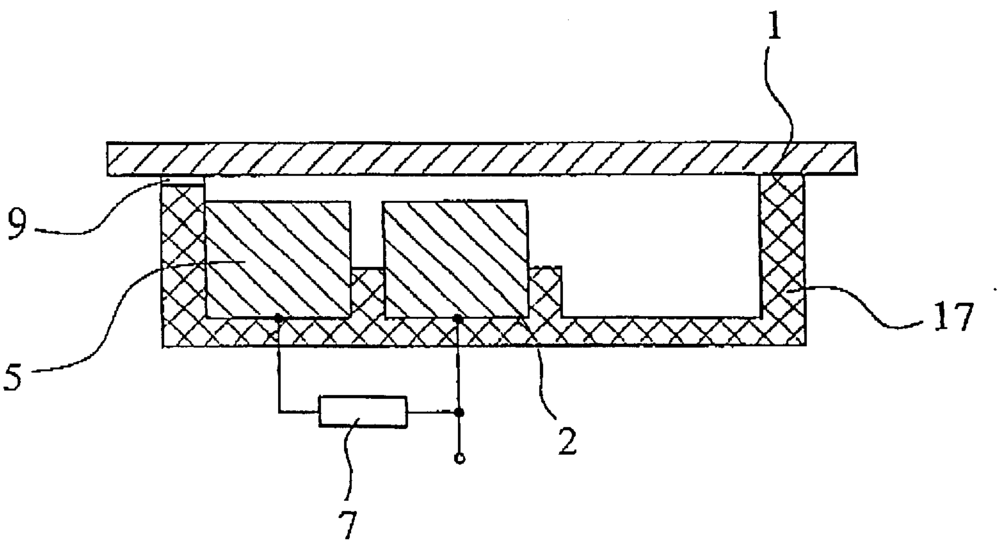
FIG. 4 shows a schematic of a second embodiment of the over-voltage protection means of the invention.
Figure 5:
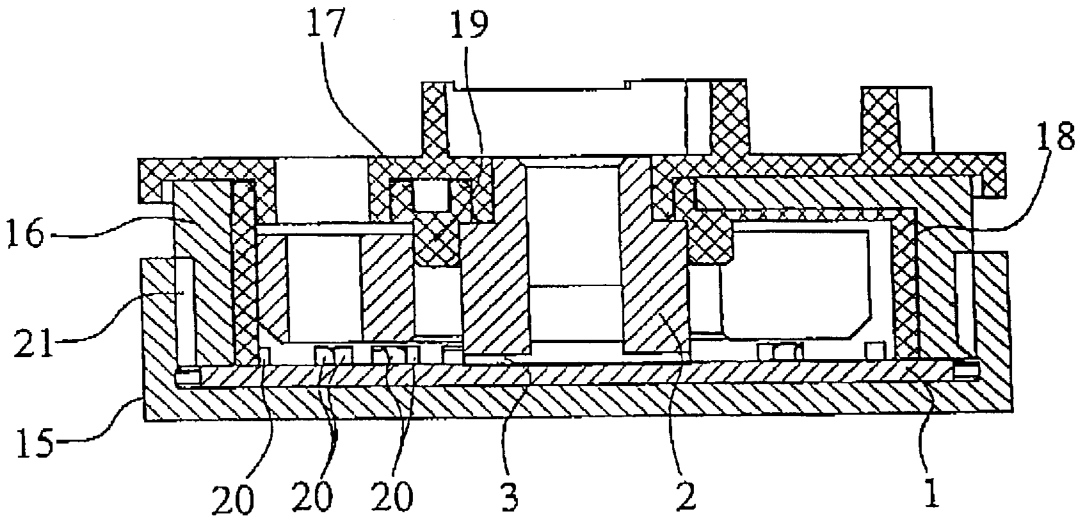
FIG. 5 shows, in a partial sectional representation, the over-voltage protection means of the invention according to the second embodiment.
Figure 6:
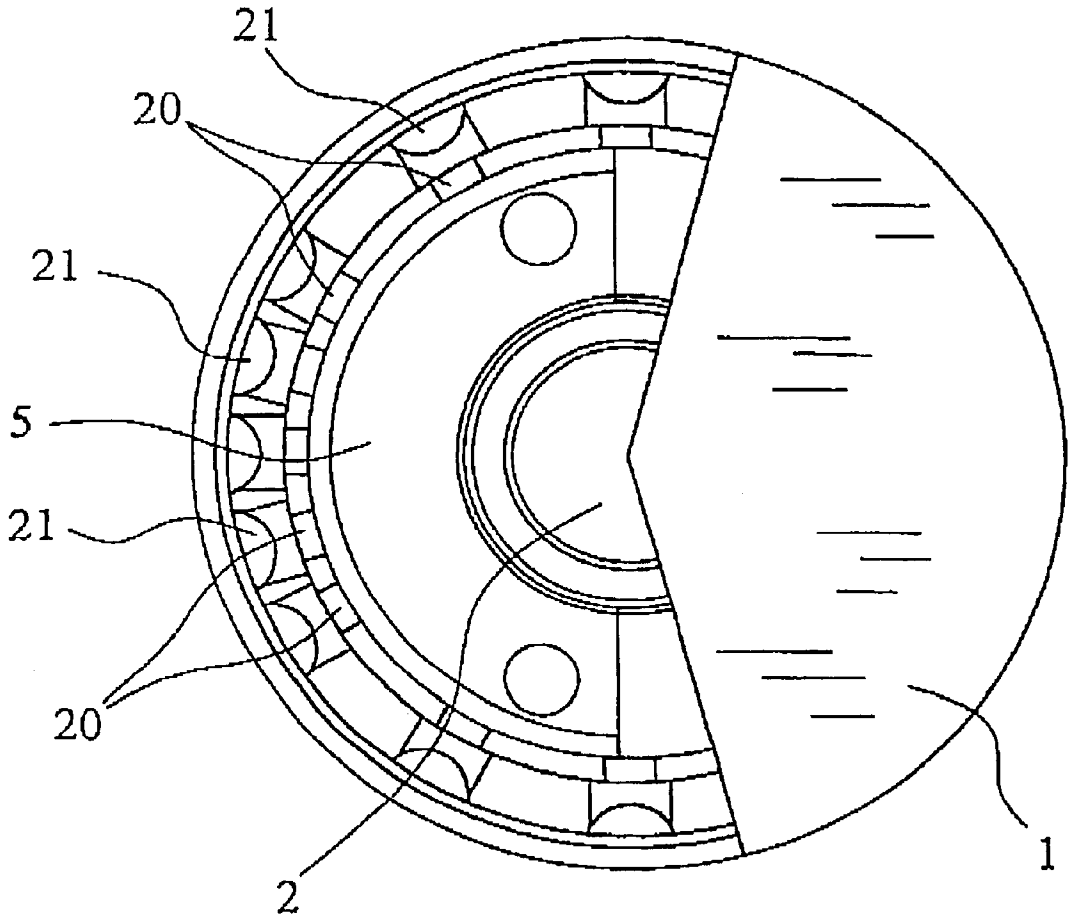
FIG. 6 shows a plan view of the second embodiment of the over-voltage protection means of the invention.

FIGS. 4 to 6 illustrate a second embodiment of the over-voltage protection means of the invention. In FIG. 4, the connection of the third electrode 5 to the varistor 7 is indicated as in FIG. 2 to illustrate the function of the over-voltage protection means. In the second embodiment of the invention, the first electrode 1 is a flat circular disk, which in FIG. 6 is shown only in part view. The second electrode 2 and the third electrode 5 are opposite the first electrode 1, and the second electrode 2 is located centrally of the first electrode 1 while the third electrode 5 is located concentrically around the second electrode 2, as shown in FIG. 6.

FIG. 5 shows that the distance between the first electrode 1 and the second electrode 2 is less than the distance between the first electrode 1 and the third electrode 5. This ensures that first the air breakdown spark gap 3 initiates between the first electrode I and the second electrode 2, and the surge current is discharged via the second electrode 2. FIG. 5, additionally shows the housing of the over-voltage protection means including a top housing part 15 and a bottom housing part 16. The bottom housing part 16 adjoins a plastic insulating part 17. Within the housing is a pot-shaped receiving element 18 for the second electrode 2 and the third electrode 5 which is also composed of plastic. A spacer 19, which is made in one piece, along with the pot-shaped receiving element 18 provides for separation of the second electrode 2 from the third electrode 5.

As FIG. 6 illustrates, the second electrode 2 is made circular and the third electrode 5 is made in the shape of a semicircle. In the bottom housing part 16, in the vicinity of the housing upper part 15 there are several openings 20, these openings 20 being located on the side of the bottom housing part 16 facing the third electrode 5. The openings 20 are thus located in the area of the bottom housing part 16 which is adjacent to the air breakdown spark gap 6 between the first electrode 1 and the third electrode 5. Corresponding to the openings 20 in the bottom housing part 16, there are recesses 21 in the upper housing part 15 through which the overpressure produced by the plasma stream can be diminished. The openings 20 and the recesses 21 provide for pressure equalization which causes propagation of the plasma stream from the area between the first electrode 1 and the second electrode 2 into the area between the first electrode 1 and the third electrode 5.

OVERVOLTAGE PROTECTION MEANS

The invention relates to an overvoltage protection means with a first electrode, a second electrode, with an air breakdown spark gap which is present or which acts between the electrodes, and with a housing which holds the electrodes, when the air breakdown spark gap is initiated an arc forming between the first electrode and the second electrode.

Electrical, but also electronic measurement, control and switching circuits, mainly also telecommunications means and systems, are sensitive to transient overvoltages, as can occur especially due to atmospheric discharges, but also due to switching operations or short circuits in the power supply grids. This sensitivity has increased to the degree in which electronic components, especially transistors and thyristors, are used; in particular, increasingly used integrated circuits are greatly endangered by transient overvoltages.

Electrical circuits operate with the voltage specified for them, the rated voltage, normally without problems. This does not hold when overvoltages occur. Overvoltages are considered to be all voltages which are above the upper tolerance limit of the rated voltages. They include mainly transient overvoltages which can occur due to atmospheric discharges, but also due to switching operations or short circuits in power supply grids and can be conductively, inductively or capacitively coupled into electrical circuits. In order to protect electrical or electronic circuits, especially electronic measurement, control and switching circuits, mainly also telecommunications means and systems where they are repeatedly used, against transient overvoltages, overvoltage protection means were developed and have been in use for more than twenty years.

An important component of an overvoltage protection means of the type under consideration here is at least one spark gap which responds at a certain overvoltage, the sparkover voltage, and thus prevents overvoltages which are larger than the sparkover voltage of the spark gap from occurring in the circuit protected by the overvoltage protection means.

It was stated initially that the overvoltage protection means as claimed in the invention has two electrodes and an air breakdown spark gap which is present or which acts between the electrodes. In addition to overvoltage protection means with an air breakdown spark gap, there are overvoltage protection means with an air flashover spark gap in which upon response a creeping discharge occurs. Overvoltage protection means with an air breakdown spark gap compared to a overvoltage protection means with an air flashover spark gap have the advantage of a greater current carrying capacity, but the disadvantage of a higher and not especially constant sparkover voltage. Therefore different overvoltage protection means with an air breakdown spark gap have been proposed which have been improved with respect to the sparkover voltage. In the area of the electrodes or the air breakdown spark gap which acts between the electrodes initiation aids have been devised in different ways, for example, such that between the electrodes there is an initiation aid which triggers a creeping discharge and which projects at least partially into the air breakdown spark gap made like a crosspiece and which consists of plastic.

An overvoltage protection means of the initially described type is known from DE 44 02 615 C2. The known overvoltage protection means has two narrow electrodes which are each made angular and each has an arcing horn and a connecting leg angled therefrom. In addition, the arcing horns of the electrodes in their areas bordering the connecting legs are provided with a hole. The holes provided in the arcing horns of the electrodes provide for the fact that at the instant of response of the overvoltage protection element, therefore the instant of initiation, the resulting arc is "started" by a thermal pressure effect, therefore migrates away from its origin. Since the arcing horns of the electrodes are arranged in a V-shape to one another, the gap to be bridged by the arc is thus enlarged as the arc migrates away, by which the arc voltage also increases.

When the air breakdown spark gap is initiated, the arc which forms causes a low-impedance connection between the two electrodes. For this reason, at the prevailing line voltage an unwanted line follow current follows via the overvoltage protection means so that the effort should be made to extinguish the arc as quickly as possible after the completed discharge process. One possibility for achieving this objective is to increase the arc length and thus the arc voltage. This possibility is implemented in the overvoltage protection means as is known from DE 44 02 615 C2. The disadvantage is that the geometrical dimensions of the electrodes become correspondingly large and thus this influence is linked to certain geometrical stipulations.

Another possibility for extinguishing the arc is to cool it by the cooling action of insulation walls and by using insulators which release gas. Here a strong flow of the extinguishing gas is necessary; this requires a major construction effort.

The object of this invention is to devise an overvoltage protection means of the type under consideration which is characterized by high line follow current extinguishing capability, but which nevertheless can be implemented with a simple construction.

The overvoltage protection means as claimed in the invention in which the aforementioned object is achieved is characterized first of all essentially in that a third electrode is assigned to the first electrode and the second electrode and between the first electrode and the third electrode a second air breakdown spark gap is present or active, that the third electrode is connected via at least one impedance, especially a varistor, directly or indirectly to the second electrode, and that after discharging the surge current via the first electrode, the first air breakdown spark gap and the second electrode, the remaining arc can be moved from the first air breakdown spark gap to the second air breakdown spark gap, especially by pneumatic or magnetic blow-out.

As in the prior art, the overvoltage protection means as claimed in the invention is generally parallel to the input of the circuit to be protected or the system to be protected or the device to be protected, and is conductively connected to the lines or terminals between which the operating voltage is present in operation. As is not unusual, the first line or the first terminal is described below as energized, while the second line or the second terminal is also labelled ground. Using this terminology then, it is generally assumed that the first electrode of the overvoltage means should be or is connected to the energized line or the energized terminal and the second electrode of the overvoltage protection means to ground. Of course, the connection of the overvoltage protection means as claimed in the invention can also take place reversed, and of course the overvoltage protection means as claimed in the invention can be used not only to protect circuits in which there is an AC voltage as the operating voltage, but the overvoltage protection means as claimed in the invention can also be easily used when the operating voltage of the circuit to be protected is a DC voltage.

With reference to the overvoltage protection means, it was stated before than the third electrode is connected directly or indirectly to the second electrode via at least one impedance. A direct connection means that the third electrode within the overvoltage protection means as claimed in the invention is connected to the second electrode. An indirect connection of the third electrode to the second electrode means that this connection can be or is accomplished outside the overvoltage protection means as claimed in the invention, for example by the fact that overvoltage protection means is a three-pole means and both the second electrode and also the third electrode must be grounded or are grounded.

In the overvoltage protection means as claimed in the invention, the air breakdown spark gap initiates when the sparkover voltage is present, and as is conventional in the prior art, between the first and the second electrode. To improve the response characteristic of the overvoltage protection means, as is known in the prior art, in the area of the electrodes or the air breakdown spark gap which acts between the electrodes a known initiation aid can be implemented. Via the initiated spark gap the surge current is discharged, likewise as is known. To suppress a possible line follow current or to extinguish a line follow current which has occurred, as claimed in the invention the remaining arc is moved from the first air breakdown spark gap to the second air breakdown spark gap. Because the third electrode, like the second electrode, is not connected directly, but via at least one impedance, especially a varistor, to ground, at this point for the overvoltage protection means a suddenly increased impedance takes effect, so that a line follow current is prevented or an existing line follow current is extinguished. Due to the impedance connected downstream of the third electrode, between the first electrode and the energized line and the energized terminal and ground there is a voltage divider which provides for the partial voltage prevailing between the first electrode and the third electrode to be less than the arc voltage at the prevailing line voltage; this partial voltage is thus no longer sufficient to maintain the arc.

The manner in which the arc remaining after discharge of the surge current is moved from the first air breakdown spark gap to the second air breakdown spark gap or from the first electrode and the second electrode to the first electrode and the third electrode, can be accomplished by different measures, especially, as already stated, by pneumatic or magnetic blow-out. Pneumatic blow-out can be accomplished by the gas or plasma stream resulting from the arc thermal currents being guided in a controlled manner. One preferred embodiment of the overvoltage protection means as claimed in the invention which implements this measure is characterized by the housing and/or the third electrode having at least one opening, pressure equalization occurring through the opening and the pressure equalization causing a controlled propagation of the gas or plasma stream from the second electrode to the third electrode. With the propagation of the gas or plasma stream from the second electrode in the direction to the third electrode, the base of the arc is moved from the second electrode to the third electrode.

The already addressed magnetic blow-out can be accomplished by arranging the electrical terminals of the overvoltage protection means in the conventional manner to one another such that the surge current produces a magnetic field which moves the arc from the first air breakdown spark gap to the second air breakdown spark gap or from the first electrode and second electrode to the first electrode and third electrode.

It goes without saying that in the overvoltage protection means as claimed in the invention both pneumatic and also magnetic blow-out of the remaining arc can be accomplished.

The teaching of this invention is fundamentally independent of the specific embodiment of the overvoltage protection means, especially of the type and shape of electrodes, the embodiment of the air breakdown spark gap or the use of initiation aids. Two preferred embodiments of the overvoltage projections as claimed in the invention will be briefly addressed below.

The first preferred embodiment of the overvoltage protection means as claimed in the invention is characterized in that the housing has an essentially cylindrical shape, that the first electrode is made as a rod-shaped middle electrode, that the second electrode and the third electrode are made as cylindrical outside electrodes and are arranged concentrically around the first electrode and that the second electrode and the third electrode are located with an axial distance to one another so that part of the first electrode is surrounded by the second electrode and another part of the first electrode is surrounded by the third electrode. In this embodiment of the overvoltage protection means as claimed in the invention the arc is then blown parallel to the lengthwise extension of the first electrode from the second electrode to the third electrode, for example by there being at least one radial opening in the third electrode or at the transition of the third electrode to the housing.

A second preferred embodiment of the overvoltage protection means as claimed in the invention is characterized in that the first electrode is made as a flat round disk, that the second electrode and the third electrode are located opposite the first electrode and that the second electrode is located centrically to the first electrode and the third electrode is located concentrically around the second electrode. This configuration and arrangement of the electrodes yields an overvoltage protection means with a very short overall height. Preferably the third electrode is not otherwise made in the shape of an annulus, but in the shape of a segment of an annulus, especially hemispherically, so that the third electrode surrounds the second electrode only partially concentrically. Furthermore it is advantageous in one such version of an overvoltage protection means as claimed in the invention if the axial distance between the first electrode and the second electrode is smaller than the axial distance between the first electrode and the third electrode. This can be accomplished by different overall heights or arrangements of the second electrode and the third electrode. Because the distance between the first electrode and the second electrode is less than the distance between the first electrode and the third electrode, it is ensured that first the air breakdown spark gap initiates between the first electrode and the second electrode and the surge current is discharged via this air breakdown spark gap, therefore via the first electrode and the second electrode.

In particular, there are a host of possibilities for embodying and developing the overvoltage protection means as claimed in the invention. In this respect, reference is made on the one hand to the claims subordinate to claim 1, on the other to the following description of preferred embodiments in conjunction with the drawings.

FIG. 1 shows a representation of the operating principle of the arrangement of the electrodes in an overvoltage protection means as claimed in the invention, FIG. 2 shows a schematic of a first embodiment of the overvoltage protection means as claimed in the invention, FIG. 3 shows a representation of the electrode arrangement in a version of the overvoltage protection means as claimed in the invention as shown in FIG. 2, partially in a section, FIG. 4 shows a schematic of a second embodiment of the overvoltage protection means as claimed in the invention, FIG. 5 shows the overvoltage protection means as claimed in the invention according to the second embodiment, partially in a section, and FIG. 6 shows a plan view of the overvoltage protection means as shown in the second embodiment.

FIG. 1 shows the operating principle of the overvoltage protection means as claimed in the invention; it consists first of all of a first electrode 1 and a second electrode 2 and an air breakdown spark gap 3 which is active between the electrodes 1, 2. One such overvoltage protection means is used to protect electrical circuits or systems or devices. If a transient overvoltage occurs which is greater than the sparkover voltage of the overvoltage protection means, it responds, i.e. the air breakdown spark gap 3 is initiated, an arc 4 is formed between the first electrode 1 and the second electrode 2.

The arc 4 yields a relatively low-resistance connection between the first electrode 1 and the second electrode 2 so that at the prevailing operating voltage an unwanted line follow current can flow via the overvoltage protection means.

In the overvoltage protection means as claimed in the invention a line follow current is prevented or a line follow current which has occurred is caused to be extinguished by the fact that the third electrode 5 is assigned to the first electrode 1 and the second electrode 2 and between the first electrode 1 and the third electrode 5 a second air breakdown spark gap 6 is present or active, that the third electrode 5 is connected via at least one impedance, here via a varistor 7, directly or indirectly to the second electrode 2, and that after discharge of the surge current via the first electrode 1, the first air breakdown spark gap 3 and the second electrode 2, the remaining arc 4 is moved from the first air breakdown spark gap 3 to the air breakdown spark gap 6 and from the first electrode 1 and the second electrode 2 to the first electrode 1 and the third electrode 5, especially by pneumatic or magnetic blow-out. If the arc is moved from the first electrode 1 and the second electrode 2 to the first electrode 1 and the third electrode 5, some of the existing operating voltage drops out via the varistor 7 and suitable dimensioning of the varistor 7 can make provisions for the fact that the voltage between the first electrode 1 and the third electrode 5 is no longer sufficient to maintain the arc 4.

FIGS. 2 and 3 show parts of a first advantageous embodiment of the overvoltage protection means in which the first electrode 1 is made as a rod-shaped electrode and the second electrode 2 and the third electrode 5 are made as cylindrical outside electrodes and are arranged concentrically around the first electrode 1. The second electrode 2 and the third electrode 5 are located at an axial distance to one another. The third electrode 5 has a radial opening 9 by which pressure equalization takes place, the pressure equalization causing propagation of the plasma stream from the area between the first electrode 1 and the second electrode 2 into the area between the first electrode 1 and the third electrode 5. The direction of the plasma stream is labelled P in FIG. 2. This plasma stream which is caused by the pressure equalization drives an arc 4 which is present between the first electrode 1 and the second electrode 2 or the base 8 of the arc 4 from the second electrode 2 to the third electrode 5.

FIG. 2 and especially FIG. 3 moreover show that the second electrode 2 and the third electrode 5 are separated from one another by an annular spacer 10. The radial distance between the first electrode 1 and the second electrode 2 or the third electrode 5 is guaranteed by two annular carrier elements 11, 12, the carrier elements 11, 12 having a radial section 13 and an axial section 14. The axial section 14 of the carrier elements 11, 12 is used together with the annular spacer 10 as a support for the second electrode 2 and the third electrode 5. Both the annular spacer 10 and also the carrier element 11, 12 are preferably made of plastic. The housing which holds the electrodes 1, 2, 5 is not shown in FIGS. 2 and 3. One such housing is then made essentially cylindrical, just like the arrangement of the electrode 1, 2, 5.

FIGS. 4 to 6 show a second embodiment of the overvoltage protection means as claimed in the invention, in FIG. 4 the connection of the third electrode 5 to the varistor 7 being indicated according to FIG. 2 to illustrate the function of the overvoltage protection means. In the second embodiment the first electrode 1 is made as a flat circular disk, in FIG. 6 only part of the first electrode 1 being shown. The second electrode 2 and the third electrode 5 are opposite the first electrode 1, the second electrode 2 being located centrically to the first electrode 1 and the third electrode 5 being located concentrically around the second electrode 2.

FIG. 5 shows that the distance between the first electrode 1 and the second electrode 2 is less than the distance between the first electrode 1 and the third electrode 5. This ensures that first the air breakdown spark gap 3 initiates between the first electrode 1 and the second electrode 2 and the surge current is discharged via the second electrode 2. FIG. 5 moreover shows the housing of the overvoltage protection means consisting of a top housing part 15 and a bottom housing part 16. The bottom housing part 16 adjoins a plastic insulating part 17. Within the housing is a pot-shaped receiving element 18 for the second electrode 2 and the third electrode 5 which likewise consists of plastic. A spacer 19 which is made in one piece with the pot-shaped receiving element 18 provides for separation of the second electrode 2 from the third electrode 5.

As FIG. 6 shows, the second electrode 2 is made circular and the third electrode 5 is made in the shape of a semicircle. In the bottom housing part 16, in the vicinity of the housing upper part 15 there are several openings 20, these openings 20 being located on the side of the bottom housing part 16 facing the third electrode 5. The openings 20 are thus located in the area of the bottom housing part 16 which is adjacent to the air breakdown spark gap 6 between the first electrode 1 and the third electrode 5. Corresponding to the openings 20 in the bottom housing part 16, in the upper housing part 15 there are recesses 21 through which the overpressure produced by the plasma stream can be diminished. The openings 20 and the recesses 21 yield pressure equalization, the pressure equalization causing propagation of the plasma stream from the area between the first electrode 1 and the second electrode 2 into the area between the first electrode 1 and the third electrode 5.

What is claimed is:

1. Over-voltage protection device which includes a housing holding a first electrode and a second electrode having a first air breakdown spark gap established therebetween such that an arc, caused by a surge current, is formed in the first air breakdown spark gap, comprising:

a third electrode associated with the first and the second electrodes such that a second air breakdown spark gap is established between the first electrode and the third electrode wherein the second electrode is connected directly to ground, and the third electrode is connected via at least one impedance to ground; and a means for moving any remaining arc formed in the first air breakdown spark gap to the second air breakdown spark gap, after discharging the surge current via the first electrode, the first air breakdown spark gap and the second electrode.

2. An over-voltage protection device as set forth in claim 1, wherein the means for moving the remaining arc comprises at least one of a pneumatic or magnetic blow-out means.

3. An over-voltage protection device as set forth in claim 1, wherein the at least one impedance comprises a varistor.

4. An over-voltage protection device as set forth in claim 1, wherein the third electrode is connected either directly or indirectly to the second electrode.

5. An over-voltage protection device which includes a housing holding a first electrode and a second electrode having a first air breakdown spark pap established therebetween such that an arc, caused by a surge current, is formed in the first air breakdown spark gap, comprising:

a third electrode associated with the first and the second electrodes such that a second air breakdown spark gap is established between the first electrode and the third electrode and the third electrode is connected via at least one impedance to the second electrode, and a means for moving any remaining arc formed in the first air breakdown spark gap, after discharging the surge current, to the second air breakdown spark gap, wherein the means for moving the remaining are is a pneumatic blow-out means comprising at least one opening formed in the housing or the third electrode, and after the first air breakdown spark gap is initiated, a pressure equalization occurs through the at least one opening which causes a controlled propagation of a gas or plasma stream from the second electrode to the third electrode and movement of the remaining arc from the first air breakdown spark gap to the second air breakdown spark gap.

6. An over-voltage protection device as set forth in claim 1, wherein the housing is substantially cylindrically shaped, the first electrode is rod-shaped and axially positioned within the housing, and the second electrode and the third electrode are cylindrically shaped and positioned in an axially-spaced relationship concentrically around the first electrode.

7. An over-voltage protection device which includes a housing holding a first electrode and a second electrode having a first air breakdown spark gap established therebetween such that an arc, caused by a surge current, is formed in the first air breakdown spark gap, comprising:

a third electrode associated with the first and the second electrodes such that a second air breakdown spark gap is established between the first electrode and the third electrode and the third electrode is connected via at least one impedance to the second electrode, and a means for moving any remaining arc formed in the first air breakdown spark gap, after discharging the surge current, to the second air breakdown spark gap, wherein the first electrode is made as a flat round disk having a central axis, and the second electrode and third electrode are located opposite and spaced from the first electrode wherein the second electrode is positioned adjacent the central axis of the first electrode and the third electrode is positioned concentrically around the second electrode.

8. An over-voltage protection device as set forth in claim 7, wherein the third electrode is shaped as a segment of an annulus.

9. An over-voltage protection device as set forth in claim 5, wherein the a t leas t one opening is formed in the housing and located adjacent to the third electrode.

10. An over-voltage protection device as set forth in claim 9, wherein the at least one opening is formed between the first electrode and the third electrode.

11. An over-voltage protection device as set forth in claim 7, wherein the axially spaced distance between the first electrode and the second electrode is smaller than the axial distance between the first electrode and the third electrode to ensure initiation of the arc between the first electrode and the second electrode upon the device receiving a surge current.

* * * * *